Oct. 30, 1928.

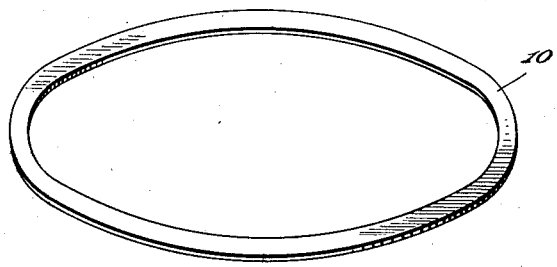
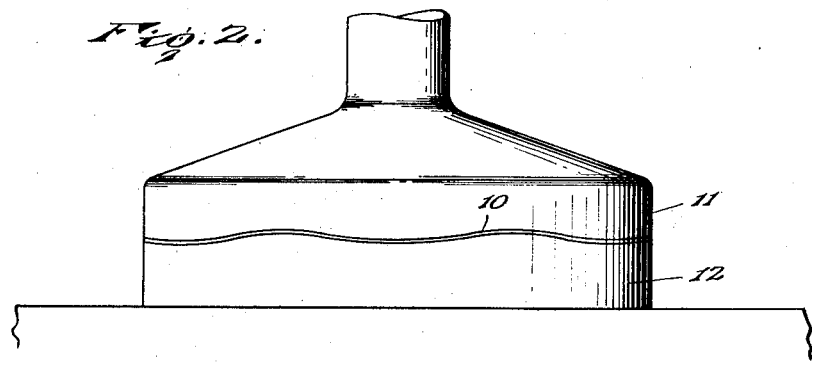
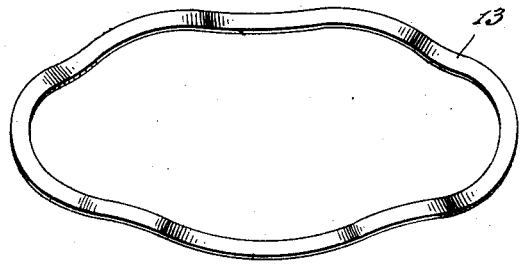

J. WILLIAMS ET AL 1,689,608

PISTON RING AND PROCESS OF MAKING SAME

Filed March 20, 1926   2 Sheets-Sheet 2

Patented Oct. 30, 1928.

1,689,608

UNITED STATES PATENT OFFICE.

JOHN WILLIAMS AND JUDSON WILLIAMS, OF PHILADELPHIA, PENNSYLVANIA.

PISTON RING AND PROCESS OF MAKING SAME.

Application filed March 20, 1926. Serial No. 96,266.

This invention relates to an improved piston ring and process of making same, the ring being especially adapted for use in conjunction with one or more conventional rings for pressing such latter rings tightly against one or both of the walls of a piston ring groove, as the case may be, so as to reduce oil pumping and compression leakage to a minimum.

It is not only essential that a tensioning ring for the present purpose shall possess strong resiliency when initially installed but, what is infinitely more important, it is further essential that the tensioning ring shall be capable of retaining its resiliency. This is due to the fact that when the tensioning ring is initially installed, said ring occupies, of course, a certain amount of the height of the ring groove and accordingly, should the ring fail to retain its resiliency and become flattened, the usual piston ring in the groove will be allowed greater vertical play and freedom than had the tensioning ring been omitted altogether. In so far as we are aware, tensioning rings heretofore developed have all been constructed of steel but experience has conclusively proven that the heat in the cylinder and piston, under ordinary operating conditions, soon takes the temper from a steel ring, with the result that the steel ring no longer functions to exert a tension on the piston ring so that fatal looseness of the piston ring quickly develops. The present invention, therefore, seeks to overcome these difficulties by providing a cast iron tensioning ring. As will be appreciated, a cast iron tensioning ring will successfully withstand any operating temperature present in an engine cylinder and will retain its resiliency throughout the period of use of the ring so that the usual piston ring will be permanently held against vertical play.

Other and incidental objects of the invention will appear during the course of the following description.

In the accompanying drawings:

Figure 1 is a perspective view of the blank from which the improved ring is formed.

Figure 2 is an elevation showing the step of die pressing the blank to produce waves or corrugations therein.

Figure 3 is a perspective view showing the corrugated ring as it is placed on the market and delivered to the user.

Figure 6:
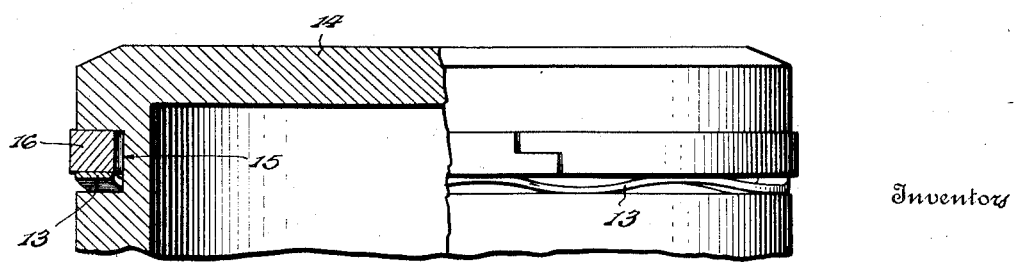
Figure 6 is a view partly in elevation and partly in section and showing the tensioning ring in position in a piston ring groove beneath a conventional piston ring.

In Figure 1 of the drawings, we have shown a flat, endless annular blank 10 of cast iron which may be of any chosen thickness. The blank is produced from a cylindrical pot-casted shell, the shell being cut to form the blank and, preferably, each blank is of uniform thickness throughout its circumference. The pot casting of the shell mentioned may be accomplished in accordance with approved methods, as may also the cutting of the shell to produce the blank and since, as shown in Figure 6, the ring evolved from the blank is of less diameter than the piston upon which the ring is used, it is unnecessary to finish or smooth the inner and outer edges of the blank. However, the side faces of the blank are preferably smoothed in approved manner.

Having formed the blank 10, said blank is then heated to an annealing temperature, say about 1500° or 1700° Fahrenheit, when, as shown in Figure 2, the blank is, while at said temperature, pressed between the corrugated male and female dies 11 and 12 of a die press and thus shaped to produce a circumferentially corrugated ring. If desired, the dies 11 and 12 may be water cooled and the ring is held between the dies until said ring has cooled sufficiently to retain its corrugated shape, when the ring is removed and, although not necessary, the ring may, immediately upon being removed from between the dies, be immersed in a quenching bath. Thus, as shown in Figure 3, an endless corrugated ring 13 is formed and, of course, the ring may be provided with any approved number of corrugations or oppositely bowed portions.

Figure 4:
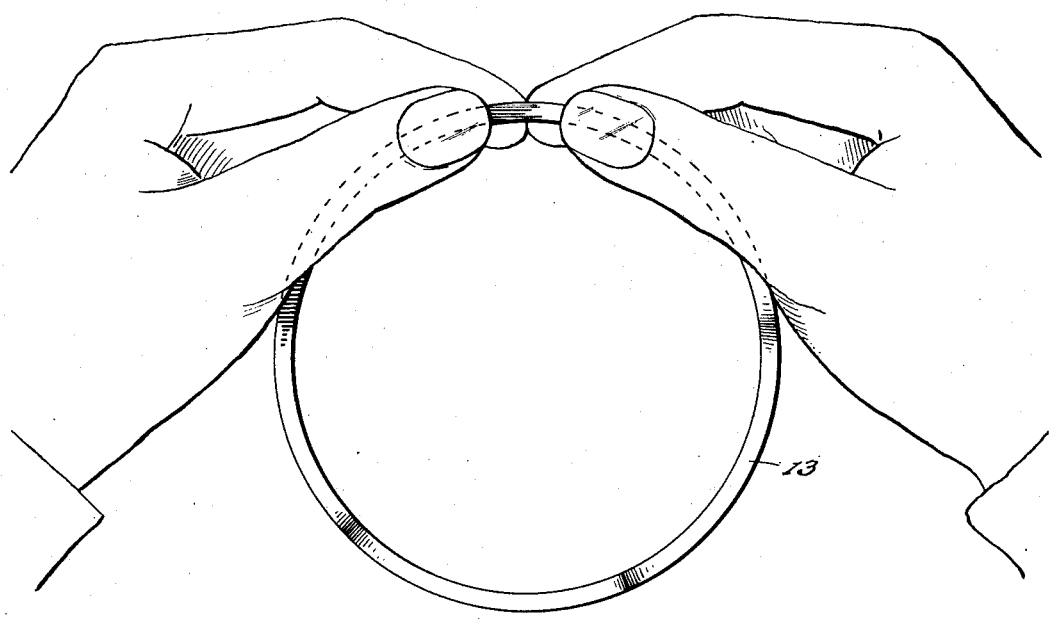
Figure 4 is an elevation showing the step of snapping the ring so that the ring may be flexed and applied in a piston ring groove.
Figure 5:
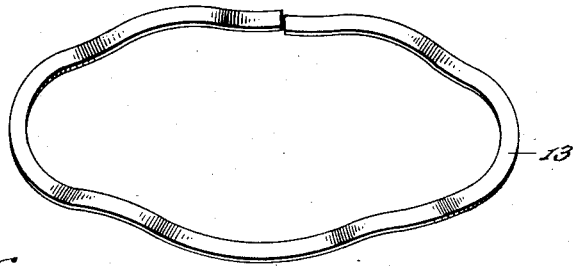
Figure 5 is a perspective view showing the ring after being snapped.

In practice, the corrugated ring, as shown in Figure 3, is shipped to the distributer, dealer, or user, as the case may be, in endless form, and in order to apply the ring to a piston it accordingly becomes necessary to snap the ring at a point in its periphery so that the ring may be flexed about the piston and engaged in the desired ring groove. As will be perceived, the ring, therefore, remains a continuously integral structure until such time as the ring is actually installed for use and it has been found that, as compared with a split ring, the endless ring is much less likely to become distorted or broken in handling. In Figure 4, we have shown the preferred manner in which the endless ring is snapped at a point in its periphery. As illustrated, a portion of the ring is grasped between the thumbs and forefingers of the hands and, as will be observed, the forefingers are disposed close together at one side of the ring. Accordingly, by flexing with the thumbs the portion of the ring intervening therebetween, the ring may be snapped against the fulcrum provided by the forefingers. In snapping the ring in the manner indicated, the ring will be unlikely to break at more than one point while a clean break will be produced. Thus, as shown in Figure 5, the ring is split ready to be applied to an engine piston and it should be observed that by forming the ring from a cylindrical pot casting, the wall of which is of uniform thickness, as in the present instance, the metal of the ring is of the same density and uniform physical properties throughout the entire circumference of the ring and, accordingly, the ring may be manually snapped at any one point in its circumference as easily as at any other point.

In Figure 6 of the drawings, we have shown the ring installed. A portion of a piston is conventionally illustrated at 14, one of the ring grooves of the piston at 15, and a conventional split piston ring at 16. By flexing the end portions of the ring 13 with respect to each other, said ring may be readily applied about the piston to enter the ring groove and, in the present instance, we have shown said ring disposed beneath the piston ring 16. The ring 13 is thus compressed or flattened somewhat between the piston ring and the bottom wall of the ring groove so that the ring 13 is thus held under tension for pressing the piston ring tightly against the top wall of the groove. Leakage of compression past the piston ring will thus be reduced to a minimum while, also, movement of the piston ring within the ring groove in a direction axially of the piston will be prevented so that oil pumping will likewise be reduced to a minimum. As will be appreciated, the ring 13 may be employed above a piston ring for holding the piston ring tightly against the bottom wall of the ring groove, or may be employed between a pair of piston rings for holding the rings of the pair of rings tightly against the top and bottom walls of the groove. As will be understood in view of the foregoing, the ring 13 will, in each instance, be held under tension so that independent movement of the piston ring or rings will be prevented. Furthermore, it is to be particularly noted that since the ring 13 is of cast iron, said ring will effectually withstand any maximum operating temperature to which an engine may be subjected and will accordingly permanently retain its resiliency so that, in contrast with conventional steel spring rings, looseness of the usual piston ring will not develop after a short period of service of the cast iron ring. Also, it is to be noted that the ring 13 will permanently exert a frictional tension on the piston ring for preventing sidewise movement of the piston ring relative to the piston so that the piston ring will be supported to cooperate with the cylinder wall for preventing slapping of the piston.

Having thus described the invention, what we claim is:

1. As a new article of manufacture, a piston ring forming element consisting of an endless circular cast metal band of substantially uniform width and thickness throughout its circumference, said band being of such thickness that it may be readily snapped at any point about its circumference.

2. A cast iron piston ring element capable of being shaped only when heated and having longitudinally bowed portions formed therein to impart resiliency to said element at the bowed portions and yieldably resist flattening of said element.

In testimony whereof we affix our signatures.

JOHN WILLIAMS. [L. S.]
JUDSON WILLIAMS. [L. S.]